April 29, 1969        G. J. TOPOL        3,441,737

RADIATION SENSITIVE SLUDGE LEVEL TESTING DEVICE

Filed June 10, 1965        Sheet 1 of 2

INVENTOR.
GEORGE J. TOPOL
BY
Albert L. Jeffers
ATTORNEY

United States Patent Office 3,441,737
Patented Apr. 29, 1969

3,441,737
RADIATION SENSITIVE SLUDGE LEVEL TESTING DEVICE
George J. Topol, Hamilton, Ontario, Canada, assignor to Bowser, Inc., Cookeville, Tenn., a corporation of Indiana
Filed June 10, 1965, Ser. No. 462,810
Int. Cl. G01n 21/26
U.S. Cl. 250—218
5 Claims

ABSTRACT OF THE DISCLOSURE

The sludge level in a settling tank is indicated by a device containing a light source and a light sensitive device spaced and positioned so that light from the source passes through the sludge toward the light sensitive device. An electrical circuit is connected to the light sensitive device for producing an electrical and audible signal having a frequency indicative of the sludge concentration.

---

This invention relates to a sludge level testing device and more particularly to a device which is adapted for testing the turbidity in liquid, fluidized beds and the like.

There has long existed a need for testing the condition of liquid in settling tanks, digesters, lagoons and the like in order to determine the degree of settling and also to locate the level of sludge or settled particles. In water treatment plants and sewage treatment plants, it is common practice to use large settling tanks in which suspended fluids are separated by a settling process. It is useful to know the rate of settling and the relative turbidity at various levels of the liquid as it is undergoing settling, as well as to establish the depth of the settled layer at the bottom of the tank or reservoir. Existing methods for establishing this information have not proved satisfactory because they are unreliable or because they are too difficult to use. For example, it has been the practice to use hollow rods through which air is expressed or expelled at various levels, and by noting the condition of the bubble as it surfaces, one can determine the degree of turbidity or the sludge level at the particular depth where such air is expelled into the liquid. The system is unreliable because it tends to be subjective and fails to give much of significance in the way of a quantitative evaluation. Other systems, including submersing containers to receive samples, tend to be unwieldy and fail to provide a continuous record of turbidity or sludge level.

In contrast to these foregoing methods and apparatus, the present invention contemplates a means for providing accurate information concerning the conditions of turbidity in the fluid or liquid at various depths and is effective to provide such information, directly relating it to a given depth. Consequently, the device is adapted to accurately locate the sludge level or settling level within a liquid.

By accurately determining the conditions of turbidity and sludge level within a settling tank, digester, or other apparatus, it is possible to know when to clean out the vessel and also how best to regulate the operation of the water treatment or other apparatus.

Therefore, it is one of the important objects of the present invention to provide an inexpensive, accurate device which is relatively simple in operation to provide information as to the turbidity and sludge level within a liquid or fluid media.

It is a further object of the present invention to provide an apparatus or device which is adapted for continuously recording the sludge level within a settling tank, digester, or the like and which can provide, if desired, a record of such level in written form.

It is still a further object of the present invention to provide a device which can provide a sensible signal either in the form of a light or sounding mechanism qualitatively related to the turbidity of the fluid undergoing test and at a known level. Thus, the device is adapted not only for determining the level of the sludge but also, as it is being submerged, can give useful information concerning the rate and degree of settling from the surface level of the liquid down through its depth to the sludge level, such device incorporating a measuring device establishing both the degree of turbidity and the particular level at which such turbidity exists.

A still further object of the present invention is to provide a device which is automatic in operation to remain at the sludge level and is adapted to provide information continuously as to where the sludge level is located. In this way, the operator can tell by direct measurement where the sludge level is located and by noting the time between successive readings can further determine the rate of settling.

It is another object of the present invention to provide accurate information concerning the turbidity of a liquid throughout its depth, thereby obaining information as to the amount of settling, the rate of settling, and the sludge level, and to obtain this information with a device which is accurate in operation and relatively easy to maintain and to operate.

Other objects and features of the present invention will become apparent from a consideration of the following description which proceeds with reference to the accompanying drawings, wherein.

Figure 1:
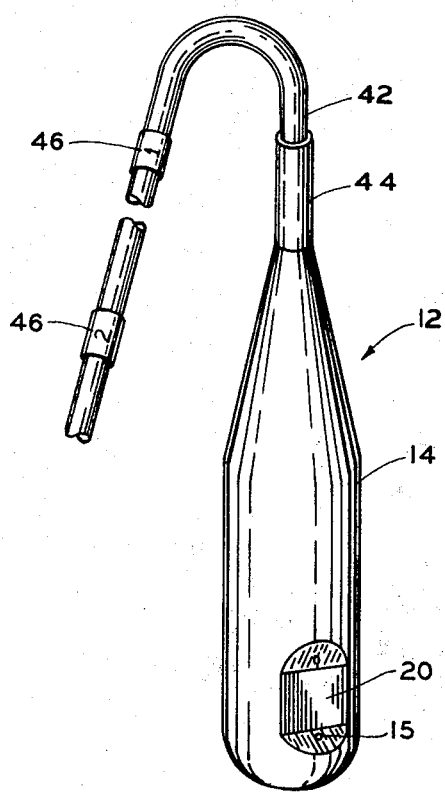
FIGURE 1 is a side elevation view of the submersible probe which is lowered into the liquid undergoing test.
Figure 3:
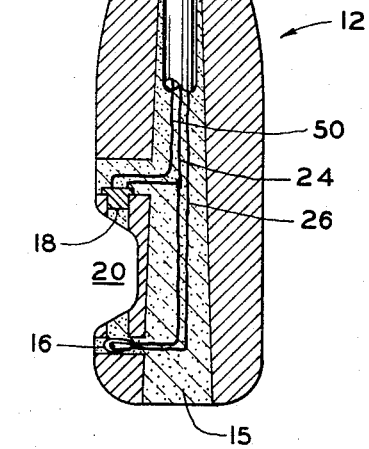
FIGURE 3 is a longitudinal section view taken through the probe and indicating the clear potting compound, illuminating source, photocell and conductors for transmitting the information to the indiactor.
Figure 4:
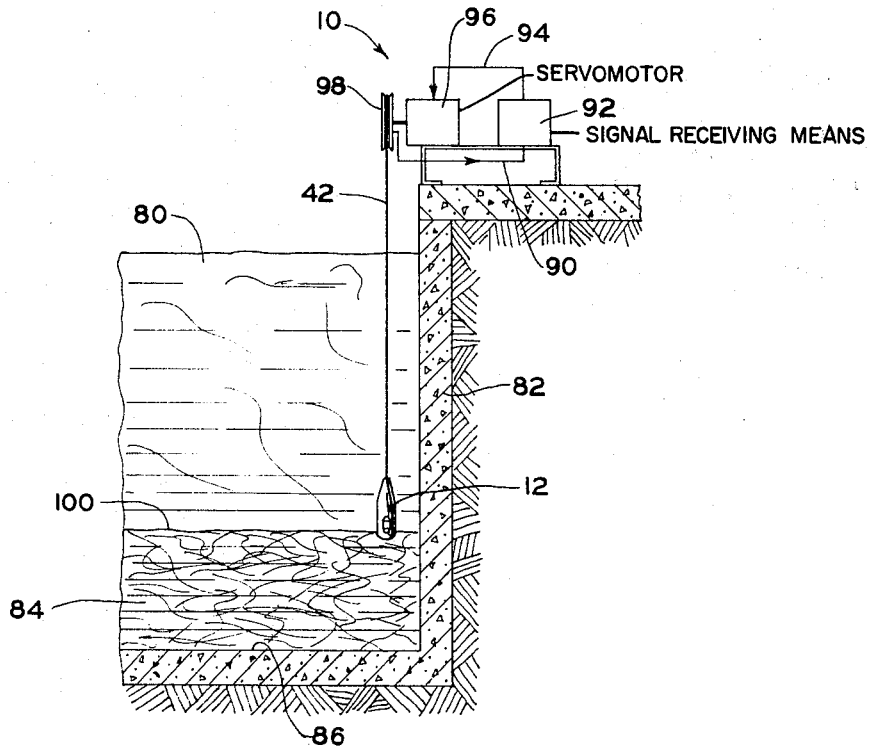
FIGURE 4 illustrates the apparatus in FIGURES 1–3 in operation within a settling tank and in which the indicator is combined with a servomotor adapted to maintain said probe at the sludge level.

Referring now to the drawings, the apparatus designated generally by reference numeral 10 (FIGURE 4) includes a probe 12 (FIGURES 1, 3) which is smooth in exterior configuration and is readily cleanable. The probe or sensing head 12 is relatively streamlined and is heavy so that it will penetrate the surface scum and the sludge which is essentially liquid. The probe will not disturb or agitate the interface between sludge layers while it is being lowered and thus provides an accurate indication of the settling without disturbing the system. The probe is further designed so that it will pass through the various layers of sludge without producing a disturbance that will cause inaccurate readings.

The probe or sensing head 12 consists of a body 14 of suitable metal composition and has a clear, transparent potting material 15 in which is embedded a light bulb 16 and photocell 18. The light bulb 16 has a line of sight with the photocell only through a gap 20 which is occupied with the fluid undergoing test so that the photocell 18 is responsive to light rays which emanate from the light bulb 16 and are promulgated through the liquid.

When the liquid is clear, the intensity of the illuminating means is substantially unaffected thereby; and, conversely, when the concentration of sludge becomes greater, its density causes the liquid to change by degrees from transparency to opaqueness, diminishing or preventing entirely any of the illumination of light bulb 16 from reaching the photocell 18.

Figure 2:
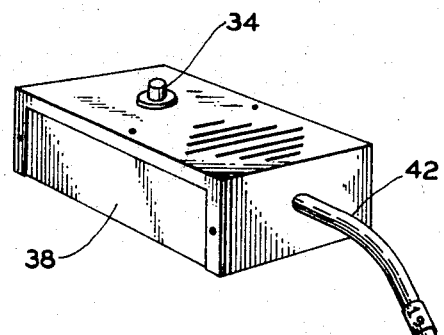
FIGURE 2 is the indicator which is operatively connected to the probe through a suspending cable by which the probe is lowered and raised and through which the signal is received from the probe.

The photocell is of cadmium sulphate composition and is of the photoconductive type which means it develops high electrical resistance in darkness and low resistance when illuminated. Both the photocell and the electrical illuminating means constituted by the bulb 16 are hermetically sealed within the potting material 15. The electrical illuminating means, constituted by the bulb 16, is energized by means of conductors 24 and 26 which are received within the potting material 15 and then passed through sheathing cable 42 which is used to suspend the probe and effect lowering and raising thereof in the liquid. Conductors 24 and 26 are connected to the opposite terminals 28 and 30 respectively of a battery 32 (FIGURE 5), and a hand-operated switch 34 is used to turn the light on and off. The hand-operated switch 34 is a part of the indicator box 38 (FIGURE 2). The cable has a seal sleeve 44 and includes along its length measurement indicia 46 (FIGURE 1) which indicates the deptth of the probe 12 within the liquid at the time the signal is being received from the probe 12 to the indicator 38.

Figure 5:
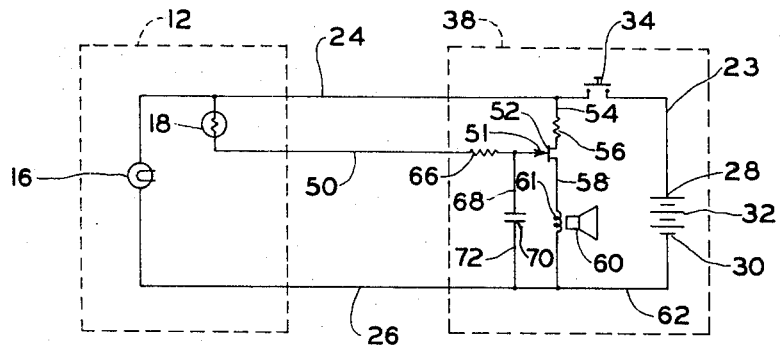
FIGURE 5 is a working diagram of an electrical system for providing a calibrated audible signal in accordance with the degree of turbidity at the liquid level.

The signal received from the probe 12 can be translated either into visual or audible form. The indicator box 38 is a small metal box housing two batteries and a simple electronic circuit (FIGURE 5).

When the push button switch 34 is closed, the light bulb 16 becomes connected to the battery 32 through a conductor 23, switch 34, conductor 24, conductor 26 and conductor 62 with the result that the light bulb 16 lights up. At the same time, the photocell 18 becomes connected to the positive terminal 28 of the battery 32. Since the photocell is illuminated, its resistance is low, and a current flows through conductor 50 and resistor 66 and charges the capacitor 70. The uni-junction transistor 52 has the property that it does not conduct until its emitter 51 reaches a certain critical voltage. When the capacitor 70 reaches this voltage, the uni-junction transistor 52 suddenly becomes conductive and rapidly discharges the capacitor 70. As a result, a short pulse of current flows through the coil 61 of the speaker 60 which produces a distinct clear click. The process of charging the capacitor 70 by the current flowing through the photocell 18 repeats. When the capacitor 70 is charged again to the critical voltage, it will be again rapidly discharged through the uni-junction transistor 52 and the coil 61 of the speaker 60. When the photocell 18 is fully illuminated, charging of the capacitor 70 is rapid, and thus the critical voltage and consequent discharge through the speaker coil 61 repeats in rapid succession. Thus, by producing clicks in rapid sequence, the speaker 60 emits a clear, high pitch sound. The lower the amount of light reaching photocell 18, the lower the charging current and the slower frequency of discharges through the speaker 60. With increasing density of the liquid, the amount of light reaching the photocell 18 decreases, and this results in lowering the frequency until for highest densities separate clicks will be heard, and in complete darkness the sound will cease entirely. The purpose of resistor 66 is to prevent excessive current flow to photocell 18 in case that it would be exposed to direct sunlight. The purpose of the resistor 56 is to provide a minute current necessary for operation of the uni-junction transistor 52.

The sound of the speaker is cut off entirely only in a sludge of extremely high density. This is one of the many advantages of the acoustic "read-out" because it enables the probe 12 to be used for a wide range of liquids or sludges. The human ear is very sensitive to detect change in pitch over wide frequency range.

*Operation*

In operation, the probe or sensing head 12 is immersed in the fluid 80 (FIGURE 4) and should the liquid be water-white, the intensity of the light emanating from light bulb 16 will be substantially undiminished as it passes through the liquid and reaches photocell 18. In this case, the photocell is fully illuminated, and its resistance is correspondingly low when the switch 34 is closed. The light 16 is illuminated by the battery 32 which is connected to its positive terminal 28 by conductors 23, 24 and to the negative terminal 30 by conductors 62 and 26. When the resistance of the photocell 18 is at a minimum, there is maximum current flow through the electronic circuit in the indicator 38, this circuit being constituted by (FIGURE 5) the conductor 50, resistance element 66, uni-junction transistor 52, conductor 58, the master speaker 60, conductor 68, capacitor 70, conductor 72. Maximum current flow in the electric circuit creates a high frequency producing a high pitch sound of the speaker 60, and correspondingly, a lower current flow produces a reduced frequency. At high current flow the capacitor charges up quickly; the uni-junction transistor 52 operates to provide a pulsation of current through the coil of speaker 60. The rate of make-break operation of the speaker 60 is dependent on the amplitude of the current, and this in turn depends upon the concentration of sludge. The rate of make-break activity of speaker 60 controls the frequency and pitch of the sound; hence, the audible pitch is inversely related to the concentration of sludge. Because the ear is sensitive to change in pitch, it is possible to evaluate the degree of sludge density by listening to the pitch. The degree of contamination is related to pitch—the greater the contamination, the lower the pitch, until finally no sound is generated. When the probe 12 reaches fluid having high density sludge, light is blocked out to a greater extent, and photocell 18 will be illuminated to a lesser degree. When the photocell is illuminated to a lesser extent, its resistance will correspondingly increase, and this resistance will, acting through the electronic circuit previously described, cause a reduction in the current flow and also a lowering of the frequency oscillation of the speaker in the manner described. The speaker will, therefore, emit a sound which reduces in pitch, and such change in pitch will become immediately apparent to the operator. Pitch is directly related to the reduction in illumination and hence inversely related to the concentration of sludge. The pitch of the speaker 60 ranges from a high pitch, at clear liquid conditions, to a low pitch, then to a clicking sound, then to no sound at all indicating maximum concentration of sludge.

As the probe is being lowered, sudden or gradual transition from high pitch to low pitch will indicate sharpness of settling out; i.e., distinctness of settling zones. If the transition from high pitch to no sound at all is a sudden one, this will indicate there has been a good separation between the supernatant liquid and the settled out layer. On the other hand, as the head is lowered, if there occurs a slow, gradual change in pitch, then this will indicate a diffused imperfect interface. By noting the rate and degree of transition, it is possible to detect any process change such as sludge bulking in the final clarifier in a typical sewage treatment plant.

The invention has a particular application in sewage treatment plants in which sewage is pumped into a settling tank 82 (FIGURE 4), and the solids gradually settle out at the bottom 86 of the tank 82. The clarified liquid 80 is drawn off from the top. It is of considerable importance to know the degree of settling within the tank 82 because the sludge must be removed either periodically or on a continuous basis. If excessive sludge 84 is allowed to accumulate at the bottom, this will detract from the capacity of the tank; if removed too quickly, then there will be a loss of clear liquid with the sludge. For this reason, it is important to measure the level of sludge in tank 82. By means of the present invention, it is possible not only to detect the level to which the sludge has settled but also to determine the clarity of the liquid as the various levels. For example, as the probe 12 is being lowered in the supernatant liquid, it is possible to determine by the pitch emitted from the speaker 60 how thoroughly the settling has taken place. If the change in pitch is gradual, this indicates an unthorough settling. The speaker will, of course, indicate according to its pitch the degree of contamination which the photocell sees. If the head as it is being lowered effects a sudden change in sound, this will indicate a clear, definite interface, evidenced by the sudden transition of a high pitch to no sound or to a distinctly different sound. All that is necessary is to read off of the cable 42 the depth figure provided by indicia mrakers 46, and by this the sludge level and conditions are known, and, if possible, using this informaion the operator can know when the opportune time exists for withdrawal of the sludge.

The invention is useful, also, in that it can be used to continuously follow the sludge level wtihin the settling tank 82. For example, still referring to FIGURE 4, the signal received from the photocell can be transmitted through the conductors within the cable 42 and the signal transmitted through a conductor 90 to an input signal receiving means 92 which in turn, acting through a conductor 94 to a servomotor 96, is adapted to operate a reel 98 connected to cable 42 for raising and lowering the probe 12. Thus, by suitably calibrating the strength of the signal of the photocell through its conductor within cable 42 to the input signal receiving means 92 and servomotor 96, it is provided that the probe 12 will at all times be maintained at a given sludge level 100. Thus, as the sludge level 100 rises, this will be sensed by the photocell which transmits a signal to the input signal receiving device 92 causing the servomotor 96 to operate the reel 98 and raise the device 12 through its cable 42 until the photocell transmits a signal calibrated through 92 to de-energize the servomotor 96. The cable carries the depth figures for the sludge level, and the operator directly reads the depth figures from the cable. There is thus a continuous monitoring of the level of the sludge by an automatic operation including a closed loop feedback comprised of the servomotor, motor and photocell signal wherein these parts function inter-relatedly to continuously maintain a photocell signal found only at a preselected sludge level.

The apparatus is useful not only in detecting the degree of contamination at a given level in clarifiers, but has other applications as well, and can be readily modified to measure turbidity in streams, to test the consistency of paper pulp, to measure levels of fluidized solids, to determine concentration of slurries, and also to detect the liquid interface between two immiscible liquids.

It is further possible to connect the output of the reel or pulley 98 to a potentiometer which is calibrated such that the unwind of the cable 42 will provide an output signal for a stylus which records the depth of a sludge level as a function of time.

The speaker can in some instances be replaced by illuminating means, in which case the visible illuminating means provides, by its dimness and brightness, the amount of light which is received by the photocell in the sensing head. It is thus possible to determine not only the sludge concentration by a direct view of the dimness or the brightness of the visible light in the indicator, but also to determine at what depth there exists a degree of suspended contaminants. In this embodiment, the brightness of the light bulb varies with the clarity of the liquid, and as the sensing head is lowered in the tank, the light gradually dims and finally disappears when the sensing head reaches a preselected depth of sludge concentration.

This embodiment is used when the sensing head is located indoors so that the light on the indicator will not be "drowned" in outdoor light.

In a still further modification of the invention, one probe is usable for several tanks, or each tank can be provided with an independent permanently installed probe and a selector switch used with a given indicator.

It is, of course, possible to adjust the sensitivity of the probe either by mechanically altering the distance between the light bulb and photocell or electronically by altering the gain of the amplifier.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations to the invention to suit individual design requirements, and it is intended that such revisions and adaptations will be included within the scope of the following claims as equivalents of the invention.

I claim:
1. Apparatus for detecting and indicating the concentration of sludge in settling tanks and the like, comprising:
   (a) a submersible device;
   (b) said submersible device having a source of illumination and a light sensitive device contained therein, said source and said light sensitive device being positioned in spaced relation so that light from said source passes through the sludge and other material surrounding said submersible device in a direction toward said light sensitive device for reception by said light sensitive device;
   (c) and electrical circuit means comprising a capacitor and a semiconductor device connected to said light sensitive device for producing an electrical signal whose frequency varies as a function of the amount of light reaching said light sensitive device, and hence as a function of the concentration of sludge surrounding said submersible device.

2. The apparatus of claim 1 and further comprising means coupled to said electrical circuit means for converting said electrical signal to an audible signal.

3. The apparatus of claim 1 wherein said electrical circuit means produces an electrical signal whose frequency decreases as the amount of light reaching said light sensitive device decreases.

4. The apparatus of claim 3 and further comprising means coupled to said electrical circuit means for converting said electrical signal to an audible signal.

5. The apparatus of claim 4 and further comprising means attached to said submersible device for raising and lowering said submersible device.

References Cited

UNITED STATES PATENTS

| 1,958,252 | 5/1934 | Singleton et al. | 250—218 X |
| 2,376,459 | 5/1945 | Stevens | 250—218 X |
| 2,555,674 | 6/1951 | Carrick. | |
| 2,789,260 | 4/1957 | Curtis et al. | 250—218 X |
| 3,177,760 | 4/1965 | Albert. | |
| 3,319,514 | 5/1967 | McAllister | 250—218 X |

WALTER STOLWEIN, *Primary Examiner.*

U.S. Cl. X.R.

340—244